US00RE50870E

(19) United States
(12) Reissued Patent
Mezzalira

(10) Patent Number: US RE50,870 E
(45) Date of Reissued Patent: Apr. 21, 2026

(54) FLEXIBLE PIPE

(71) Applicant: Fitt S.p.A., Sandrigo (IT)

(72) Inventor: Alessandro Mezzalira, Sandrigo (IT)

(73) Assignee: Fitt S.p.A., Vicenza (IT)

(21) Appl. No.: 29/989,210

(22) Filed: Feb. 11, 2025

Related U.S. Patent Documents

Reissue of:

(64) Patent No.: Des. 959,618
Issued: Aug. 2, 2022
Appl. No.: 35/511,334
Filed: Oct. 19, 2020
Int. Filing Date: Oct. 19, 2020
Int. Reg. No.: DM/212590
Int. Reg. Date: Oct. 19, 2020
Int. Reg. Pub. Date: Feb. 12, 2021

(30) Foreign Application Priority Data

May 29, 2020 (EM) ..... 007976220

(51) LOC (15) Cl. ..... 23-01

(52) U.S. Cl.
USPC ..... D23/266

(58) Field of Classification Search
USPC ..... D23/200, 233, 235, 237, 259, 266, D23/261–265, 268

(Continued)

(56) References Cited

U.S. PATENT DOCUMENTS 2,888,954 A * 6/1959 Gates ..... F16L 11/085 156/149
3,050,087 A * 8/1962 Caplan ..... B29D 23/18 156/143

(Continued)

FOREIGN PATENT DOCUMENTS

WO WO-2014113202 A1 * 7/2014 ..... B29C 48/21

OTHER PUBLICATIONS

U.S. Trademark Registration No. 2,082,703, Registered Jul. 29, 1997, Filed Nov. 15, 1993, covering polyethylene pipe for reclaimed water applications.

(Continued)

*Primary Examiner* — Darlington Ly
(74) *Attorney, Agent, or Firm* — Kilyk & Bowersox, P.L.L.C.

(57) CLAIM

The ornamental design for a flexible pipe, as shown and described.

DESCRIPTION

The patent or application file contains at least one drawing executed in color. Copies of this patent or patent application publication with color [drawing(s)] *drawings* will be provided by the Office upon request and payment of the necessary fee.

[FIG. 1.2] *FIG. 1* is a perspective view of a flexible pipe, showing my new design[in a fuchsia color]; *and*

[FIG. 1.3] *FIG. 2* is an end view of the flexible pipe shown in [FIG. 1.2;] *FIG. 1*.

[FIG. 3.2 is a perspective view of a flexible pipe, showing my new design in a turquoise color; and]

[FIG. 3.3 is an end view of the flexible pipe shown in FIG. 3.2]

The break lines indicate that no particular length is claimed, and any portion shown between the breaks forms no part of the claimed design.

1 Claim, 3 Drawing Sheets
(3 of 3 Drawing Sheet(s) Filed in Color)

Figure 1:
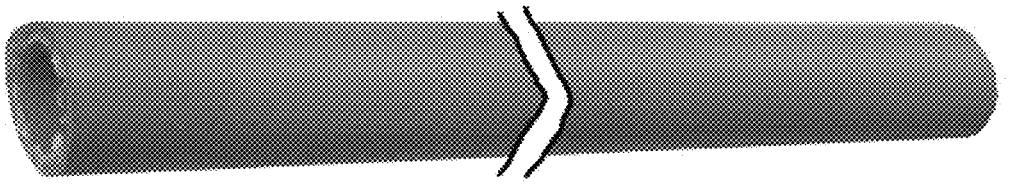

Matter enclosed in heavy brackets [ ] appears in the original patent but forms no part of this reissue; matter printed in italics indicates the additions made by reissue.

(58) Field of Classification Search
CPC ..... F16L 11/085; F16L 11/04; F16L 11/10; F16L 11/14
See application file for complete search history.

(56) References Cited

U.S. PATENT DOCUMENTS

| | | | | | |
|---|---|---|---|---|---|
| 3,805,848 | A * | 4/1974 | Chrow | B29D 23/001 | 428/474.9 |
| 3,898,118 | A * | 8/1975 | Yamaoka | B29C 48/15 | 156/203 |
| 4,299,256 | A * | 11/1981 | Bacehowski | B04B 5/0442 | 264/300 |
| 4,904,323 | A * | 2/1990 | Nadeau | B29C 48/151 | 156/203 |
| D348,511 | S * | 7/1994 | Denton | D23/266 | |
| 5,617,900 | A * | 4/1997 | Weil | F16L 59/00 | 138/110 |
| D381,405 | S * | 7/1997 | Waidele | D23/266 | |
| 5,941,286 | A * | 8/1999 | Fauble | F16L 9/12 | 138/DIG. 3 |
| D469,520 | S | 1/2003 | McLean | | |
| D488,544 | S * | 4/2004 | Akaltan | D23/266 | |
| D642,245 | S * | 7/2011 | Mezzalira | D23/266 | |
| D642,246 | S * | 7/2011 | Mezzalira | D23/266 | |
| D724,187 | S | 3/2015 | Savage et al. | | |
| D737,429 | S * | 8/2015 | Doraiswamy | 24/112 | |
| D836,757 | S | 12/2018 | Mishan | | |
| D886,251 | S * | 6/2020 | Mezzalira | D23/266 | |
| 2005/0221039 | A1* | 10/2005 | Dunlap | F16L 11/085 | 428/36.9 |
| 2006/0076070 | A1* | 4/2006 | Yanadori | F16L 11/086 | 138/126 |
| 2008/0202618 | A1* | 8/2008 | Shinohara | F16L 11/085 | 138/124 |
| 2009/0205736 | A1* | 8/2009 | Mezzalira | F16L 11/085 | 138/125 |
| 2010/0108172 | A1* | 5/2010 | Liu | B29C 48/21 | 138/137 |
| 2010/0282354 | A1* | 11/2010 | Polasky | B29C 70/202 | 156/149 |
| 2011/0036442 | A1* | 2/2011 | Hahn | B29D 23/001 | 156/149 |
| 2013/0186469 | A1* | 7/2013 | Bourgeois | B32B 1/08 | 138/140 |
| 2014/0110013 | A1* | 4/2014 | Mezzalira | F16L 11/085 | 138/124 |

OTHER PUBLICATIONS

U.S. Trademark Registration No. 4,970,690, Registered May 31, 2016, Filed Nov. 10, 2014, covering pipe joint thread sealing tape. Propane Hose Pipe posted Apr. 24, 2014 [online], [retrieved May 14, 2020]. Retrieved from internet, https://www.amazon.com/Propane-Braided-Reinforced-Camping-pressure/dp/B00JWPFYFU/ref=sr_1_18?crid=1IJHA8V6FRJJ6&keywords=reinforced+pipe&qid=1652525325&sprefix=reinforced+pape%2Caps%2C118%sr=8-18 (Year: 2014).*

* cited by examiner

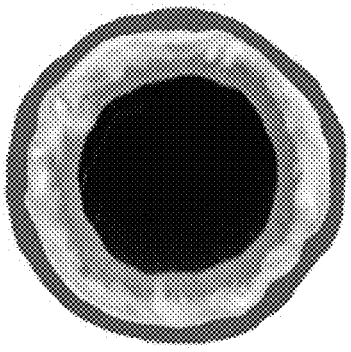
FIG. 2
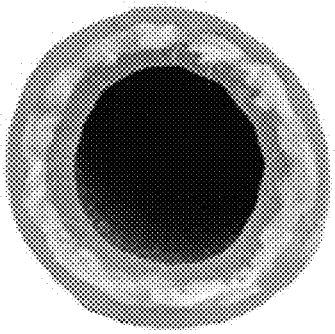
FIG. 3.3
CANCELLED

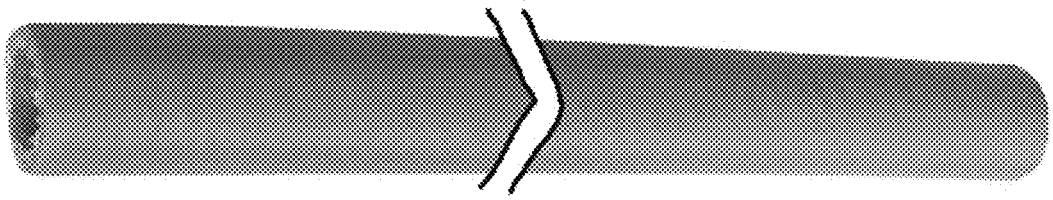
FIG. 3.2
CANCELLED